April 11, 1933.  A. F. BENDEL  1,903,742
FEEDER AND WATERER
Original Filed Jan. 17, 1931  2 Sheets-Sheet 1
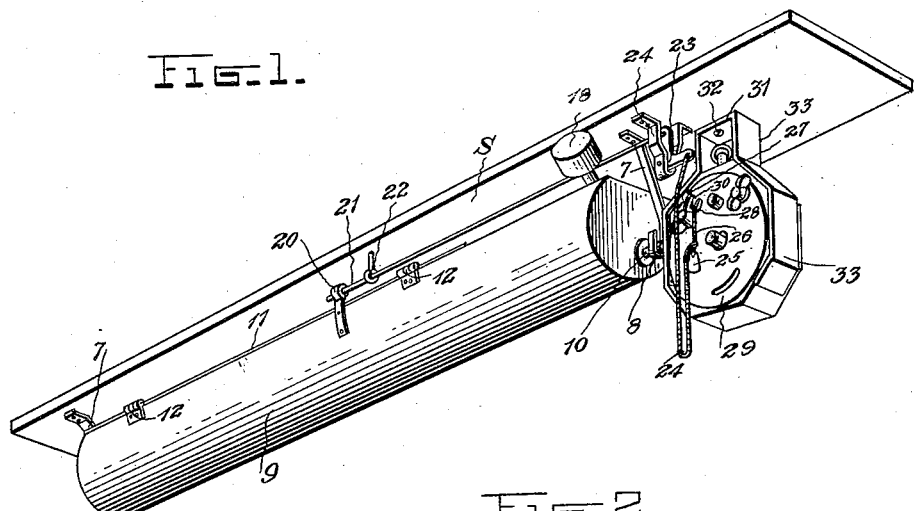
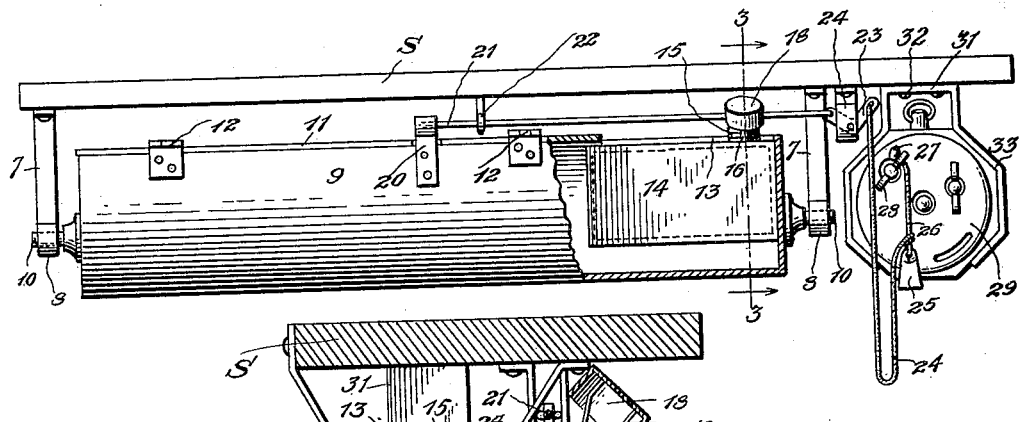
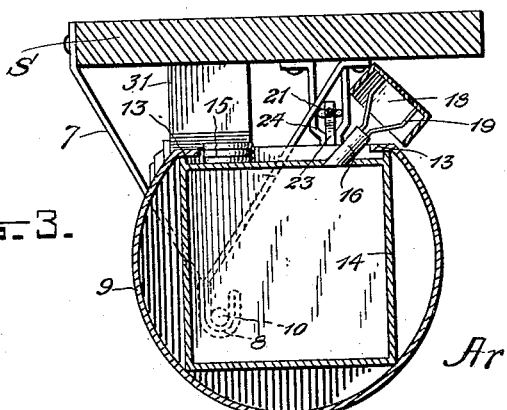
Inventor
Arthur F. Bendel.
Witness
E. Hunt
By H. R. Willson & Co.
Attorneys.

April 11, 1933.　　　A. F. BENDEL　　　1,903,742
FEEDER AND WATERER
Original Filed Jan. 17, 1931　2 Sheets-Sheet 2
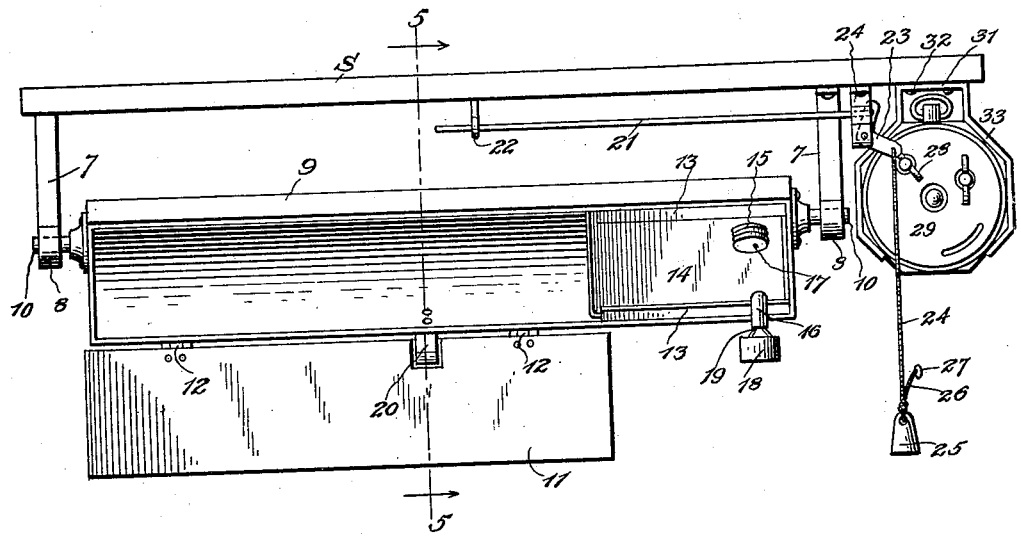
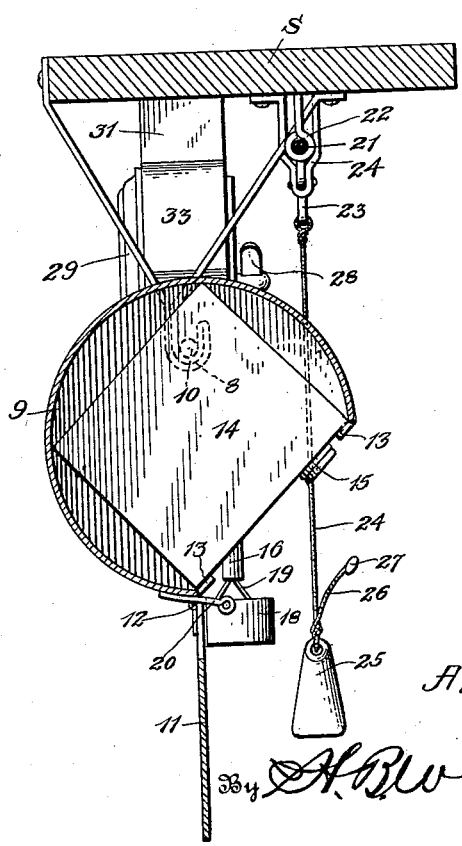
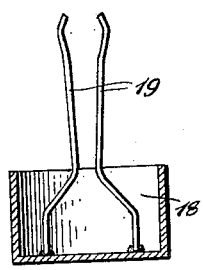
Witness
E. E. Hunt.
Inventor
Arthur F. Bendel
By H. B. Willson &Co
Attorneys.

Patented Apr. 11, 1933

1,903,742

UNITED STATES PATENT OFFICE

ARTHUR F. BENDEL, OF READING, PENNSYLVANIA

FEEDER AND WATERER

Application filed January 17, 1931, Serial No. 509,513. Renewed February 13, 1933.

The invention relates to devices for feeding animals or poultry, for watering them, or for effecting both watering and feeding operations.

The primary object of the invention is to provide a device of the class set forth which is sufficiently simple and inexpensive to allow manufacture at small cost, yet will be rugged and efficient, may be conveniently filled and cleaned, and may be completely relied upon to accomplish the required feeding and watering.

In the preferred embodiment herein disclosed, the device supplies both feed and water to the poultry or animals when tripped, and it is a further aim to provide a novel construction in which a tank for the water (or for liquid food if desired) is normally held in one end portion of a container for the feed, the construction however being such as to allow easy removal of said tank when desired, for instance for filling or cleaning, or when its use is not required.

A further aim is to provide a construction well adapted to discharging water or liquid food without waste, into a receptacle placed for its reception. When released, the container falls to a discharge position and freely swings to and fro several times before coming to rest, but the part of the invention now under consideration, delays descent of the liquid to the receptacle until said container practically ceases oscillation, so that the liquid will be discharged without waste into the receptacle.

With the foregoing in view, the invention resides in the novel subject matter hereinafter described and claimed, description being accomplished by reference to the accompanying drawings.

Fig. 1 is a perspective view of a combined feeder and waterer constructed in accordance with my invention, showing the normal relation of parts.

Fig. 2 is a side elevation partly broken away and in section, the parts being shown in the same positions as in Fig. 1.

Fig. 3 is a vertical transverse sectional view on line 3—3 of Fig. 2.

Fig. 4 is a side elevation showing the relation of parts when the alarm clock has tripped the device, allowing it to discharge the feed and water.

Fig. 5 is a vertical transverse sectional view on line 5—5 of Fig. 4.

Fig. 6 is a detail sectional view partly in elevation showing the cup which prevents splashing of the water or liquid food when the container moves to discharge position and swings to and fro before coming to rest.

A preferred construction has been illustrated and will be specifically described, with the understanding that within the scope of the invention as claimed, numerous variations may be made.

S denotes an elevated support which may be of any desired form and supported in any preferred way, for instance, by securing it to the ceiling or other part of a poultry house, an animal hutch or the like, or by providing it with legs.

Secured to and projecting downwardly from the support S are two brackets 7 having horizontally alined hook-shaped bearings 8 at their lower ends. A horizontally elongated container 9 is received between the brackets 7 and is provided with trunnions 10 which are rotatably and removably engaged with the bearings 8. The top of the container 9 may be considered as open, although this top may if desired be provided with a loosely hinged closure 11, whose hinges are indicated at 12. The longitudinal side walls of the container 9 are provided, in one end portion of the latter, with longitudinal inwardly projecting flanges 13. A closed tank 14 for water or liquid food, is received in the aforesaid end portion of the container 9 and is normally held against movement through the open side of said container, by contact with the flanges 13. By sliding the tank 14 longitudinally within the container 9 however until it is disengaged from the flanges 13, said tank may be removed from said container, facilitating cleaning and refilling. This construction also allows the tank to be entirely removed from the container 9, should its use not be required.

At 15, I have shown a filling cap for the tank 14, and at 16 have illustrated a tubular liquid discharge spout. When the container 9 and tank 14 are in the position shown in Figs. 1, 2 and 3, the spout 16 and the cap 15 are above the liquid level in the tank, but when container and tank move to the downwardly tilted position shown in Figs. 4 and 5, the spout 16 is downwardly presented to discharge the liquid. To admit air to the tank as the liquid is discharged, the cap 15 is preferably provided with a small opening 17.

A small cup 18 is carried by the tank 14 to receive the liquid discharged through the spout 16 when said tank and spout are in the position shown in Figs. 4 and 5. This cup is preferably provided with two spring arms 19 received in the tubular spout 16 to hold said cup in place and to permit detachment of it when required, for cleaning. When the container 9 and tank 14 descend from the position of Figs. 1, 2 and 3 to that shown in Figs. 4 and 5, they will rock to and fro about the trunnions 10, finally coming to rest. During such oscillation of parts, the liquid from the spout 16 is received in the cup 18 and is retained by the latter instead of being splashed and wasted. By the time the parts 9 and 14 have substantially come to rest, the liquid overflows from the cup 18 and descends into a receptacle (not shown) previously placed upon the ground or floor in position to receive said liquid.

The portion of the container 9 not occupied by the tank 14, is of course intended to contain feed of any desired character, and when said container is released and moved to the position shown in Figs. 4 and 5, the door 11 swings open by gravity and the feed discharges onto the ground or floor. While it is preferable that both feed and water shall be delivered at the same time, this is of course not essential. The feed-containing portion of the container 9 may be left empty if desired and only water or liquid feed discharged from the tank 14 at the required time, or if desired the tank 14 may be removed or left empty and the device used only for discharging feed.

The container 9 is provided with an appropriate keeper 20 which is normally engaged by horizontal latch rod 21, so that said keeper and latch rod co-act with the trunnions 10 and the bearings 8 in normally supporting the container 9 in the position shown in Figs. 1 to 3. The trunnions 10 however are so positioned as to cause gravitation of the container to the position illustrated in Figs. 4 and 5, when the latch rod 21 is disengaged from the keeper 20. The end of the rod 21 near the keeper 30, is, slidably received in a screw eye or the like 22 carried by the support S. The other end of rod 21 is pivoted to a bell crank 23 which is carried by a bracket 24 secured to the lower side of the support S. A cable, cord or the like 24 is secured at one end to the bell crank 23 and is provided at its other end with a weight 25. In the present showing, this cable or the like 24 is provided with a short extension 26 having an enlargement 27. These parts co-act with the alarm winding key 28 of a conventional alarm clock 29, one end of said key having a notch 30 of a size to loosely admit the extension 26 but sufficiently narrow to prevent passage of the enlargement 27 therethrough. Hence, when the key 28 stands at an angle such as that illustrated in Figs. 1 and 2, the weight 25 may be suspended by engaging the extension 26 with the notch 30. With the weight so suspended, the rod 21 will remain engaged with the keeper 20 and consequently the container 9 will be held in the position shown in Figs. 1 to 3. When the alarm mechanism of the clock operates at the predetermined time however, and the key 28 rotates as usual, the extension 26 may slide from the notch 30 when said key has turned a sufficient amount. Consequently, the weight 25 will descend, pulling upon the cable or the like 24 and operating the bell crank 23 to release the rod 21 from the keeper 20. When this takes place, the container 9 swings downwardly to the position illustrated in Figs. 4 and 5, and discharge of feed, liquid, or both takes place, as above described.

For holding the alarm clock 29, I provide a bracket formed from a single metal strip 31. This strip is bent into substantially arched formation and is provided with a flat crown portion 31 adapted for anchorage by screws or the like 32, against the lower side of the support S. The arms 33 of the metal strip are bowed away from each other to jointly and yieldably embrace the clock 29, effectively holding it in the required position, yet allowing removal of said clock for winding, setting, or use at other points.

Excellent results are obtainable from the details disclosed and they are therefore preferably followed. Attention however is again invited to the fact, that within the scope of the invention as claimed, numerous variations may be made.

I claim:—

1. A device of the class described comprising an elevated horizontal support, brackets secured to and projecting downwardly from said support, the lower ends of said brackets having horizontally alined bearings, a container between said brackets having trunnions engaged with said bearings, said container being provided also with a keeper spaced from the axis of said trunnions, a horizontal rod under said support normally engaging said keeper, said rod, keeper, trunnions and bearings normally supporting said container, said trunnions being positioned to allow tilting of said container to discharge position upon release of said rod, a bearing carried by said support and slidably supporting one end of said rod, a bell crank to which the other end of said rod is pivoted, a bracket carried by said support and carrying said bell crank, and means for moving said bell crank to release said rod from said keeper.

2. A device of the class described comprising an elevated horizontal support, brackets secured to and projecting downwardly from said support, the lower ends of said brackets having horizontally alined bearings, a container between said brackets having trunnions engaged with said bearings, said container being provided also with a keeper spaced from the axis of said trunnions, a horizontal rod under said support normally engaging said keeper, said rod, keeper, trunnions and bearings normally supporting said container, said trunnions being positioned to allow tilting of said container to discharge position upon release of said rod, a bearing carried by said support and slidably supporting one end of said rod, a bell crank to which the other end of said rod is pivoted, a bracket carried by said support and carrying said bell crank, a weight connected with said bell crank for releasing said rod when allowed to descend, and means mounted on said support for normally holding said weight against descent.

3. A device of the class described comprising a closed liquid tank having a normally open liquid outlet, disposed normally above the liquid level in the tank, pivots supporting said tank and allowing swinging of the latter to discharge position, and an anti-splash cup carried by said tank and positioned to receive the liquid discharged from said outlet when said tank is in said discharge position, said cup and said outlet being relatively positioned to allow free overflow of liquid from said cup until the tank becomes empty.

4. In a device of the class described, a horizontally elongated container having an open top, the longitudinal side walls of said container having inwardly projecting longitudinal flanges at one end portion of the container, and a liquid tank slidably received in said container and held normally by said flanges against movement through said open top of said container, said tank being removable through said open top of said container when longitudinally slid from engagement with said flanges.

In testimony whereof I affix my signature.

ARTHUR F. BENDEL.